(12) United States Patent
Weng

(10) Patent No.: US 11,719,217 B2
(45) Date of Patent: Aug. 8, 2023

(54) MULTI-AXIAL WAVE ENERGY CONVERSION DEVICE

(71) Applicant: FLH Energy Technology Ltd., New Taipei (TW)

(72) Inventor: Ching-Liang Weng, New Taipei (TW)

(73) Assignee: FLH Energy Technology Ltd., New Taipei (TW)

( * ) Notice: Subject to any disclaimer, the term of this patent is extended or adjusted under 35 U.S.C. 154(b) by 0 days.

(21) Appl. No.: 17/714,133

(22) Filed: Apr. 5, 2022

(65) Prior Publication Data
US 2023/0175470 A1 Jun. 8, 2023

(30) Foreign Application Priority Data

Dec. 7, 2021 (TW) .................................. 110145640

(51) Int. Cl.
*F03B 13/16* (2006.01)

(52) U.S. Cl.
CPC .......... *F03B 13/16* (2013.01); *F05B 2240/90* (2013.01); *F05B 2240/941* (2013.01)

(58) Field of Classification Search
CPC ............ F03B 13/16–20; F05B 2240/90; F05B 2240/91; F05B 2240/9113; F05B 2240/915; F05B 2240/9152; F05B 2240/91521; F05B 2240/94; F05B 2240/941
See application file for complete search history.

(56) References Cited

U.S. PATENT DOCUMENTS

| 5,789,826 A | 8/1998 | Kumbatovic |
| 8,358,025 B2* | 1/2013 | Hogmoe ................. F03B 13/20 290/53 |
| 2007/0102937 A1* | 5/2007 | Resen Steenstrup ....... F03B 13/1815 290/53 |
| 2010/0207390 A1* | 8/2010 | Zimmermann ....... F03B 13/187 60/398 |
| 2010/0327597 A1* | 12/2010 | Patel ..................... F03B 17/063 290/54 |

(Continued)

FOREIGN PATENT DOCUMENTS

| CN | 105443309 A | * | 3/2016 |
| CN | 105443309 A |   | 3/2016 |

(Continued)

*Primary Examiner* — Mark A Laurenzi
*Assistant Examiner* — Xiaoting Hu
(74) *Attorney, Agent, or Firm* — Winston Hsu

(57) ABSTRACT

A multi-axial wave energy conversion device includes a carrier, a main body coupled to the carrier, a wave energy conversion assembly, a rotating mechanism, a lifting mechanism and a control unit electrically connected to the rotating mechanism and the lifting mechanism. The wave energy conversion assembly is coupled to the main body and includes an arm. The rotating mechanism is coupled between the carrier and the main body. The lifting mechanism is coupled between the arm and the main body. The control unit is for controlling the rotating mechanism to drive the main body to rotate relative to the carrier around a vertical axis for adjusting an orientation of the arm relative to the carrier, and further for controlling the lifting mechanism to drive the arm to rotate relative to the main body around a horizontal axis for adjusting an included angle between the arm and the main body.

10 Claims, 10 Drawing Sheets

(56) References Cited

U.S. PATENT DOCUMENTS

| | | | | |
|---|---|---|---|---|
| 2011/0042954 A1* | 2/2011 | Werjefelt | ............... | F03B 13/20 |
| | | | | 290/53 |
| 2014/0042749 A1* | 2/2014 | Siegel | .................. | F03B 13/183 |
| | | | | 29/428 |
| 2016/0083920 A1* | 3/2016 | Siltala | ...................... | E02B 9/08 |
| | | | | 60/499 |

FOREIGN PATENT DOCUMENTS

| | | | | |
|---|---|---|---|---|
| CN | 105736222 A | | 7/2016 | |
| CN | 105888930 A | * | 8/2016 | |
| CN | 112796355 A | | 5/2021 | |
| DE | 19612124 A1 | * | 10/1997 | ......... F03B 13/1815 |
| EP | 1 678 419 A1 | | 7/2006 | |
| TW | 201734307 A | | 10/2017 | |
| TW | M627270 U | | 5/2022 | |

\* cited by examiner

MULTI-AXIAL WAVE ENERGY CONVERSION DEVICE

BACKGROUND OF THE INVENTION

1. Field of the Invention

The present invention relates to an electricity generating device, and more specifically, to a multi-axial wave energy conversion device with high mobility, great environmental adaptability and stable electricity generation.

2. Description of the Prior Art

Wave energy conversion technology is used for converting wave energy into electricity. The wave energy is unstable and irregular but is inexhaustible in supply and always available for use. Therefore, wave energy conversion has a greater potential than any other ocean energy conversion. However, the conventional wave energy conversion device cannot withstand storm wind and heavy rain brought by typhoons and has poor mobility. Therefore, before a typhoon is approaching, it has to spend a lot of manpower and material resources implementing countermeasures for preventing damage of the wave energy conversion device caused by the typhoon. Furthermore, the conventional wave energy conversion device cannot be adjusted according to different environmental conditions. Therefore, the conventional wave energy conversion device cannot generate electricity stably.

SUMMARY OF THE INVENTION

Therefore, it is an objective of the present invention to provide a multi-axial wave energy conversion device with high mobility, great environmental adaptability and stable electricity generation for solving the aforementioned problems.

In order to achieve the aforementioned objective, the present invention discloses a multi-axial wave energy conversion device. The multi-axial wave energy conversion device includes a carrier, a main body, a wave energy conversion assembly, a rotating mechanism and a control unit. The main body is coupled to the carrier. The wave energy conversion assembly is coupled to the main body. The wave energy conversion assembly includes at least one electricity generator, an arm and a driving component. The at least one electricity generator is coupled between the main body and the arm or coupled between the arm and the driving component, so that the at least one electricity generator is driven to generate electricity by a movement of the arm relative to the main body or a movement of the driving component relative to the arm. The rotating mechanism is coupled between the carrier and the main body and configured to drive the main body to rotate relative to the carrier around a vertical axis for adjusting an orientation of the arm relative to the carrier. The control unit is electrically connected to the rotating mechanism and configured to control the rotating mechanism to drive the main body to rotate relative to the carrier around the vertical axis.

According to an embodiment of the present invention, the control unit controls the rotating mechanism to drive the main body to rotate relative to the carrier around the vertical axis according to at least one of a wind direction, a wave direction and an electricity generation amount.

According to an embodiment of the present invention, the rotating mechanism includes a turnable component and a driving assembly, and the driving assembly is coupled to the turnable component and configured to drive the turnable component to rotate relative to one of the main body and the carrier.

According to an embodiment of the present invention, the driving assembly is electrically connected to the control unit, and the control unit is configured to control the driving assembly to drive the turnable component to rotate.

According to an embodiment of the present invention, the turnable component is rotatably coupled to the one of the main body and the carrier and fixedly coupled to another one of the main body and the carrier.

According to an embodiment of the present invention, the multi-axial wave energy conversion device further includes at least one lifting mechanism coupled between the arm and the main body and electrically connected to the control unit, and the control unit is further configured to control the lifting mechanism to drive the arm to rotate relative to the main body around a horizontal axis perpendicular to the vertical axis for adjusting an included angle included between the arm and the main body.

According to an embodiment of the present invention, the control unit controls the at least one lifting mechanism to drive the arm to rotate relative to the main body around the horizontal axis according to at least one of a wave height, a tide level and an electricity generation amount.

According to an embodiment of the present invention, the at least one lifting mechanism is further configured to generate the electricity, and the at least one lifting mechanism includes a hydraulic energy conversion component, a motor generator, a hydraulic cylinder, a piston, an oil sump and an oil circulation system. The motor generator is coupled to the hydraulic energy conversion component. The hydraulic cylinder is coupled to one of the arm and the main body. The piston is movably disposed on the hydraulic cylinder to divide the hydraulic cylinder into a first chamber and a second chamber. The piston is coupled to another one of the arm and the main body. The oil sump is for accommodating an hydraulic oil. The oil circulation system is for transporting the hydraulic oil. When the motor generator drives the hydraulic energy conversion component to transport the hydraulic oil to one of the first chamber and the second chamber through the oil circulation system, the piston is driven to move to another one of the first chamber and the second chamber, and when the piston is driven to move to the one of the first chamber and the second chamber to transport the hydraulic oil to the another one of the first chamber and the second chamber, the hydraulic energy conversion component drives the motor generator to generate the electricity.

According to an embodiment of the present invention, the oil circulation system includes a first tubing, a first switch valve, a second tubing, a three-position and four-way directional control valve, a third tubing, a second switch valve, a fourth tubing, a fifth tubing, a third switch valve, a sixth tubing, a seventh tubing, an eighth tubing, a ninth tubing, a tenth tubing, an eleventh tubing and a twelfth tubing. The first tubing is communicated between the hydraulic energy conversion component and the oil sump. The second tubing is communicated between the first switch valve and the hydraulic energy conversion component. The third tubing is communicated between the three-position and four-way directional control valve and the first switch valve. The fourth tubing is communicated between the second switch valve and the three-position and four-way directional control valve. The fifth tubing is communicated between the second chamber and the second switch valve. The sixth tubing is communicated between the third switch valve and the first chamber. The seventh tubing is communicated between the three-position and four-way directional control valve and the third switch valve. The eighth tubing is communicated between the oil sump and the three-position and four-way directional control valve. The ninth tubing is communicated between the first chamber and the oil sump. The tenth tubing is communicated between the second switch valve and the oil sump. The eleventh tubing is communicated between the first switch valve and the second switch valve. The twelfth tubing is communicated between the first switch valve and the third switch valve.

According to an embodiment of the present invention, the oil circulation system further includes a first check valve, a second check valve, a third check valve and a fourth check valve. The first check valve is disposed on the ninth tubing and configured to restrain the hydraulic oil from flowing from the first chamber toward the oil sump. The second check valve is disposed on the tenth tubing and configured to restrain the hydraulic oil from flowing from the second chamber toward the oil sump through the second switch valve. The third check valve is disposed on the eleventh tubing and configured to restrain the hydraulic oil from flowing from the first switch valve toward the second switch valve. The fourth check valve is disposed on the twelfth tubing and configured to restrain the hydraulic oil from flowing from the first switch valve toward the third switch valve.

According to an embodiment of the present invention, the carrier is a wheel type carrier, a caterpillar type carrier or a rail type carrier.

In order to achieve the aforementioned objective, the present invention further discloses a multi-axial wave energy conversion device. The multi-axial wave energy conversion device includes a carrier, a main body, a wave energy conversion assembly, at least one lifting mechanism and a control unit. The main body is coupled to the carrier. The wave energy conversion assembly is coupled to the main body. The wave energy conversion assembly includes at least one electricity generator, an arm and a driving component. The at least one electricity generator is coupled between the main body and the arm or coupled between the arm and the driving component, so that the at least one electricity generator is driven to generate electricity by a movement of the arm relative to the main body or a movement of the driving component relative to the arm. The at least one lifting mechanism is coupled between the arm and the main body and configured to drive the arm to rotate relative to the main body around a horizontal axis for adjusting an included angle included between the arm and the main body. The control unit is electrically connected to the at least one lifting mechanism and configured to control the at least one lifting mechanism to drive the arm to rotate relative to the main body around the horizontal axis.

According to an embodiment of the present invention, the control unit controls the at least one lifting mechanism to drive the arm to rotate relative to the main body around the horizontal axis according to at least one of a wave height, a tide level and an electricity generation amount.

According to an embodiment of the present invention, the at least one lifting mechanism is further configured to generate the electricity, and the at least one lifting mechanism includes a hydraulic energy conversion component, a motor generator, a hydraulic cylinder, a piston, an oil sump and an oil circulation system. The motor generator is coupled to the hydraulic energy conversion component. The hydraulic cylinder is coupled to one of the arm and the main body. The piston is movably disposed on the hydraulic cylinder to divide the hydraulic cylinder into a first chamber and a second chamber. The piston is coupled to another one of the arm and the main body. The oil sump is for accommodating an hydraulic oil. The oil circulation system is for transporting the hydraulic oil. When the motor generator drives the hydraulic energy conversion component to transport the hydraulic oil to one of the first chamber and the second chamber through the oil circulation system, the piston is driven to move to another one of the first chamber and the second chamber, and when the piston is driven to move to the one of the first chamber and the second chamber to transport the hydraulic oil to the another one of the first chamber and the second chamber, the hydraulic energy conversion component drives the motor generator to generate the electricity.

According to an embodiment of the present invention, the oil circulation system includes a first tubing, a first switch valve, a second tubing, a three-position and four-way directional control valve, a third tubing, a second switch valve, a fourth tubing, a fifth tubing, a third switch valve, a sixth tubing, a seventh tubing, an eighth tubing, a ninth tubing, a tenth tubing, an eleventh tubing and a twelfth tubing. The first tubing is communicated between the hydraulic energy conversion component and the oil sump. The second tubing is communicated between the first switch valve and the hydraulic energy conversion component. The third tubing is communicated between the three-position and four-way directional control valve and the first switch valve. The fourth tubing is communicated between the second switch valve and the three-position and four-way directional control valve. The fifth tubing is communicated between the second chamber and the second switch valve. The sixth tubing is communicated between the third switch valve and the first chamber. The seventh tubing is communicated between the three-position and four-way directional control valve and the third switch valve. The eighth tubing is communicated between the oil sump and the three-position and four-way directional control valve. The ninth tubing is communicated between the first chamber and the oil sump. The tenth tubing is communicated between the second switch valve and the oil sump. The eleventh tubing is communicated between the first switch valve and the second switch valve. The twelfth tubing is communicated between the first switch valve and the third switch valve.

According to an embodiment of the present invention, the oil circulation system further includes a first check valve, a second check valve, a third check valve and a fourth check valve. The first check valve is disposed on the ninth tubing and configured to restrain the hydraulic oil from flowing from the first chamber toward the oil sump. The second check valve is disposed on the tenth tubing and configured to restrain the hydraulic oil from flowing from the second chamber toward the oil sump through the second switch valve. The third check valve is disposed on the eleventh tubing and configured to restrain the hydraulic oil from flowing from the first switch valve toward the second switch valve. The fourth check valve is disposed on the twelfth tubing and configured to restrain the hydraulic oil from flowing from the first switch valve toward the third switch valve.

According to an embodiment of the present invention, the multi-axial wave energy conversion device further includes a rotating mechanism. The rotating mechanism includes a turnable component and a driving assembly. The driving assembly is coupled to the turnable component and electrically connected to the control unit, and the control unit is further configured to control the driving assembly to drive the turnable component to rotate relative to one of the main body and the carrier, so as to drive the main body relative to the carrier around a vertical axis perpendicular to the horizontal axis for adjusting an orientation of the arm relative to the carrier.

According to an embodiment of the present invention, the turnable component is rotatably coupled to the one of the main body and the carrier and fixedly coupled to another one of the main body and the carrier.

According to an embodiment of the present invention, the control unit controls the driving assembly to rotate the turnable component to drive the main body to rotate relative to the carrier around the vertical axis according to at least one of a wind direction, a wave direction and an electricity generation amount According to an embodiment of the present invention, the carrier is a wheel type carrier, a caterpillar type carrier or a rail type carrier.

In summary, in the present invention, the multi-axial wave energy conversion device can utilize the rotating mechanism to drive the main body to rotate relative to the carrier around the vertical axis for adjusting an orientation of the arm relative to the carrier and can further utilize the lifting mechanism to drive the arm to rotate relative to the main body around the horizontal axis perpendicular to the vertical axis for adjusting the included angle included between the arm and the main body according to different environmental conditions. Therefore, the multi-axial wave energy conversion device can generate electricity stably. Furthermore, before a typhoon is approaching, a user can adjust the orientation of the arm relative to the carrier and adjust the included angle included between the arm and the main body to move the wave energy conversion assembly away from the sea and then move the carrier to move the multi-axial wave energy conversion device to a safe place, so as to prevent any damage of the multi-axial wave energy conversion device. Besides, the lifting mechanism of the present invention can be used to not only adjust the included angle included between the arm and the main body but also generate electricity. Therefore, the multi-axial wave energy conversion device has high mobility, great environmental adaptability and stable electricity generation.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "left", "right", "front", "back", etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, if not specified, the term "couple" or "connect" is intended to mean either an indirect or direct electrical/mechanical connection. Thus, if a first device is coupled to or connected to a second device, that connection may be through a direct electrical/mechanical connection, or through an indirect electrical/mechanical connection via other devices and connections.

Figure 1:
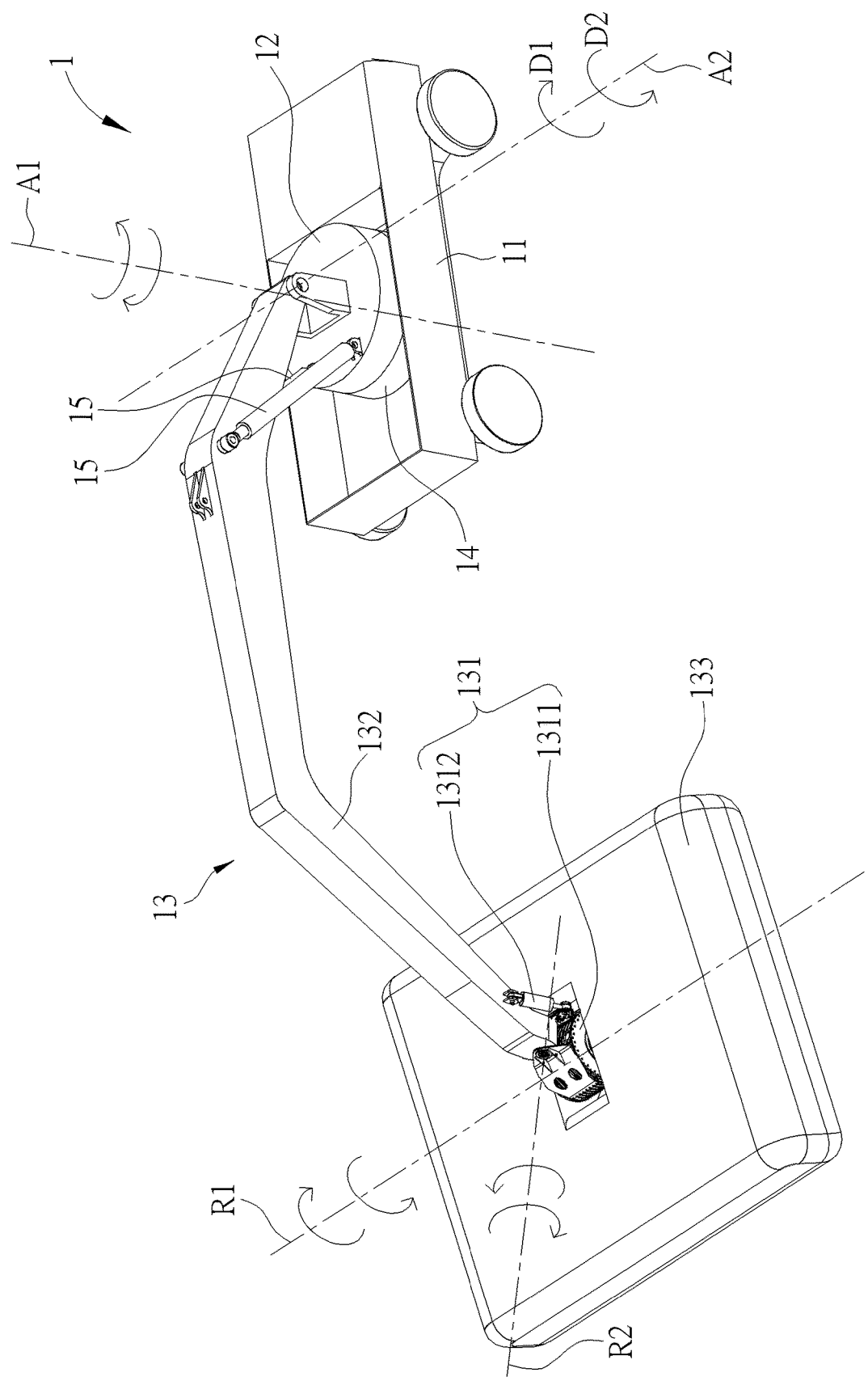
FIG. 1 is a diagram of a multi-axial wave energy conversion device according to a first embodiment of the present invention.
Figure 2:
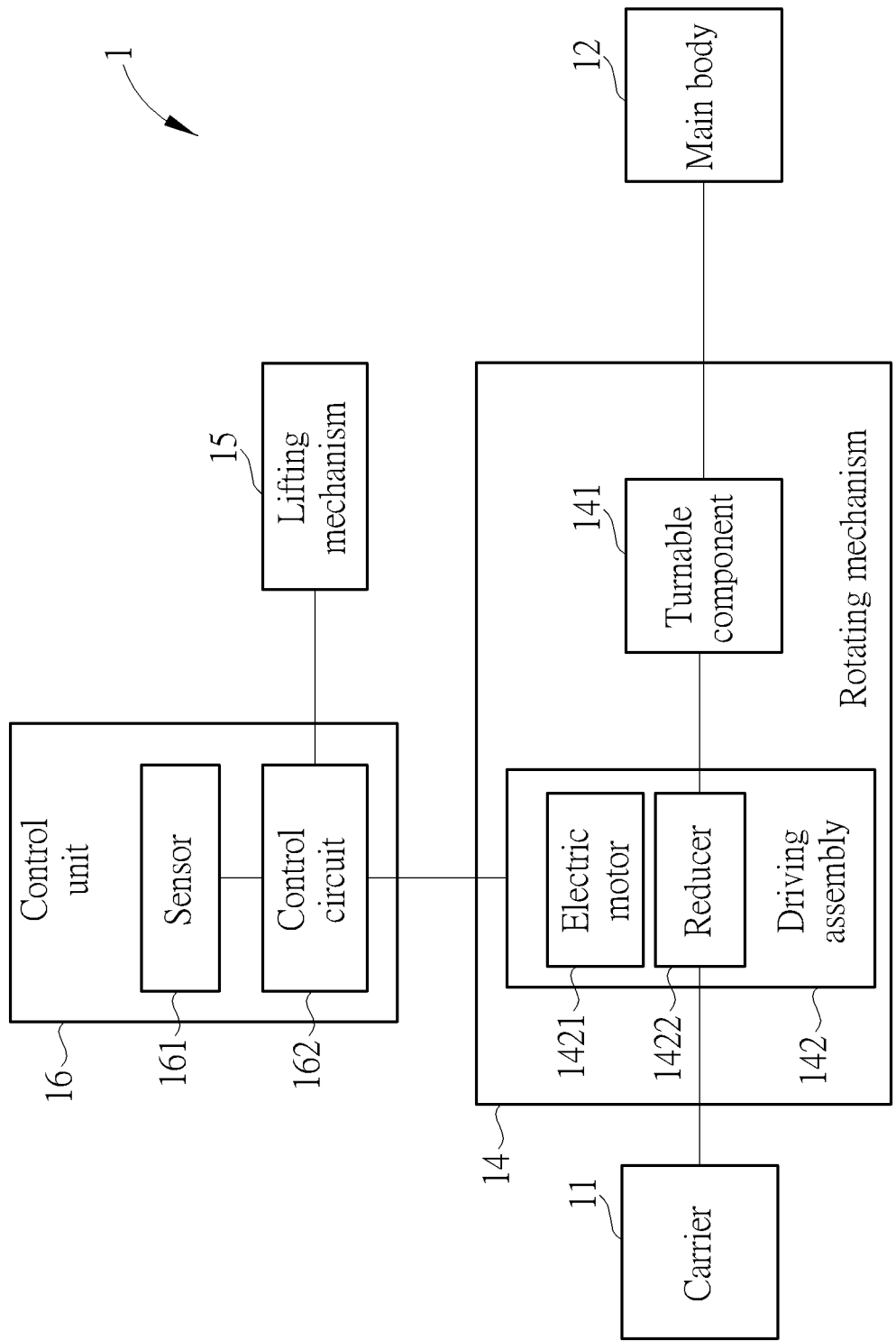
FIG. 2 is a functional block diagram of the multi-axial wave energy conversion device according to the first embodiment of the present invention.

Please refer to FIG. 1 and FIG. 2. FIG. 1 is a diagram of a multi-axial wave energy conversion device 1 according to a first embodiment of the present invention. FIG. 2 is a functional block diagram of the multi-axial wave energy conversion device 1 according to the first embodiment of the present invention. As shown in FIG. 1 and FIG. 2, the multi-axial wave energy conversion device 1 includes a carrier 11, a main body 12 and a wave energy conversion assembly 13. The main body 12 is coupled to the carrier 11. The wave energy conversion assembly 13 is coupled to the main body 12. The wave energy conversion assembly 13 includes at least one electricity generator 131, an arm 132 and a driving component 133. In this embodiment, the wave energy conversion assembly 13 includes a permanent magnet generator 1311 disposed between the arm 132 and the driving component 133, and a hydraulic generator 1312 disposed between the permanent magnet generator 1311 and the arm 132. When the driving component 133 is driven to move by waves relative to the arm 132, a movement of the driving component 133 relative to the arm 132 can drive the permanent magnet generator 1311 and the hydraulic generator 1312 to generate electricity. A rotor of the permanent magnet generator 1311 is coupled to the driving component 133, and a stator of the permanent magnet generator 1311 is coupled to the arm 132 and is rotatable relative to the arm 132 around a second rotating axis R2. The second rotating axis R2 is different from a first rotating axis R1 around which the rotor of the permanent magnet generator 1311 rotates relative to the stator of the permanent magnet generator 1311. Preferably, the second rotating axis R2 can be substantially perpendicular to the first rotating axis R1. Furthermore, a piston of the hydraulic generator 1312 is coupled to the stator of the permanent magnet generator 1311, and a hydraulic cylinder of the hydraulic generator 1312 is coupled to the arm 132. In such a way, when the driving component 133 is driven by the waves to drive the rotor of the permanent magnet generator 1311 to rotate relative to the stator of the permanent magnet generator 1311 around the first rotating axis R1, the permanent magnet generator 1311 can generate electricity by a magnetic flux variation caused by a rotating movement of the rotor of the permanent magnet generator 1311 relative to the stator of the permanent magnet generator 1311 around the first rotating axis R1. When the driving component 133 is driven by the waves to drive the stator of the permanent magnet generator 1311 to rotate relative to the arm 132 around the second rotating axis R2, a rotating movement of the stator of the permanent magnet generator 1311 relative to the arm 132 around the second rotating axis R2 can drive a movement of the piston of the hydraulic generator 1312 relative to the hydraulic cylinder of the hydraulic generator 1312 to drive hydraulic oil to flow, so that the hydraulic generator 1312 can generate electricity.

However, the present invention is not limited to this embodiment. It depends on practical demands. For example, in another embodiment, the wave energy conversion assembly can only include one permanent magnet generator disposed between the arm and the driving component without any hydraulic generator. Alternatively, in another embodiment, the wave energy conversion assembly can include one permanent magnet generator or one hydraulic generator disposed between the arm and the main body for driving the permanent magnet generator or the hydraulic generator to generate electricity by a movement of the arm relative to the main body.

In this embodiment, the carrier 11 can be a wheel type carrier. However, the present invention is not limited to this embodiment. For example, in another embodiment, the carrier can be a caterpillar type carrier or a rail type carrier.

Besides, as shown in FIG. 1 and FIG. 2, the multi-axial wave energy conversion device 1 further includes a rotating mechanism 14, two lifting mechanisms 15 and a control unit 16. The rotating mechanism 14 is coupled between the carrier 11 and the main body 12 and configured to drive the main body 12 to rotate relative to the carrier 11 around a vertical axis A1 for adjusting an orientation of the arm 132 relative to the carrier 11. The two lifting mechanisms 15 are respectively located at two sides of the arm 132. Each of the lifting mechanisms 15 is coupled between the arm 132 and the main body 12 and configured to drive the arm 132 to rotate relative to the main body 12 around a horizontal axis A2 for adjusting an included angle included between the arm 132 and the main body 12. The control unit 16 is electrically connected to the rotating mechanism 14 and each of the lifting mechanisms 15. The control unit 16 is configured to control the rotating mechanism 14 to drive the main body 12 to rotate relative to the carrier 11 around the vertical axis A1 and/or control the two lifting mechanisms 15 to drive the arm 132 to rotate relative to the main body 12 around the horizontal axis A2.

However, the number of the lifting mechanism of the present invention is not limited to this embodiment. For example, in another embodiment, the multi-axial wave energy conversion device can include one lifting mechanism at one side of the arm only.

Preferably, the control unit 16 can control the rotating mechanism 14 to drive the main body 12 to rotate relative to the carrier 11 around the vertical axis A1 according to at least one information of a wind direction, a wave direction and an electricity generation amount, and the control unit 16 can control the two lifting mechanisms 15 to drive the arm 132 to rotate relative to the main body 12 around the horizontal axis A2 according to at least one information of a wave height, a tide level and the electricity generation amount. In other words, the control unit 16 can include at least one sensor 161 and a control circuit 162. The at least one sensor 161 is configured to sense at least one information of the wind direction, the wave direction, the wave height, the tide level and the electricity generation amount. The control circuit 162 can control the rotating mechanism 14 and/or the two lifting mechanisms 15 according to a sensing result of the at least one sensor 161.

Understandably, in another embodiment, the control unit can retrieve information of at least one of the wind direction, the wave direction, the wave height, the tide level and the electricity generation amount by any other method. For example, the control unit can be connected to Bureau of Meteorology or a marine meteorological data buoy station via internet and download such information therefrom.

Specifically, the rotating mechanism 14 includes a turnable component 141 and a driving assembly 142. The driving assembly 142 is coupled between the turnable component 141 and the carrier 11 and configured to drive the turnable component 141 to rotate relative to the carrier 11 around the vertical axis A1. More specifically, the turnable component 141 can be a rotating disc, and the vertical axis A1 passes through a center of the rotating disc. The driving assembly 142 is electrically connected to the control unit 16. The control unit 16 is configured to control the driving assembly 142 to drive the turnable component 141 to rotate relative to the carrier 11 around the vertical axis A1. In this embodiment, the turnable component 141 is fixedly coupled to the main body 12 and rotatably coupled to the carrier 11, so that the main body 12 is driven to rotate together with the turnable component 141 relative to the carrier 11 around the vertical axis A1 when the control unit 16 controls the driving assembly 142 to drive the turnable component 141 to rotate relative to the carrier 11 around the vertical axis A1.

However, the present invention is not limited to this embodiment. It depends on practical demands. The turnable component can be rotatably coupled to one of the main body and the carrier and fixedly coupled to the other one of the main body and the carrier. For example, in another embodiment, the turnable component can be fixedly coupled to the carrier and rotatably coupled to the main body, and the driving assembly is coupled between the turnable component and the main body. The control unit is configured to control the driving assembly to drive a rotating movement of the turnable component relative to the main body.

Preferably, in this embodiment, the driving assembly 142 can include an electric motor 1421 and a reducer 1422. The reducer 1422 can be a gear type reducer or a belt type reducer. However, the present invention is not limited to this embodiment. For example, in another embodiment, the driving assembly can drive the turnable component to rotate by a pneumatic or hydraulic manner.

Besides, the control circuit 162 of the control unit 16 can be configured to drive each of the two lifting mechanisms 15 to switch between a driving mode and an electricity generating mode. Each of the two lifting mechanisms 15 can be configured to drive the arm 132 to rotate relative to the main body 12 around the horizontal axis A2 when each of the two lifting mechanisms 15 switches to the driving mode. Each of the two lifting mechanisms 15 can be configured to generate electricity when each of the two lifting mechanisms 15 switches to the electricity generating mode.

Figure 3:
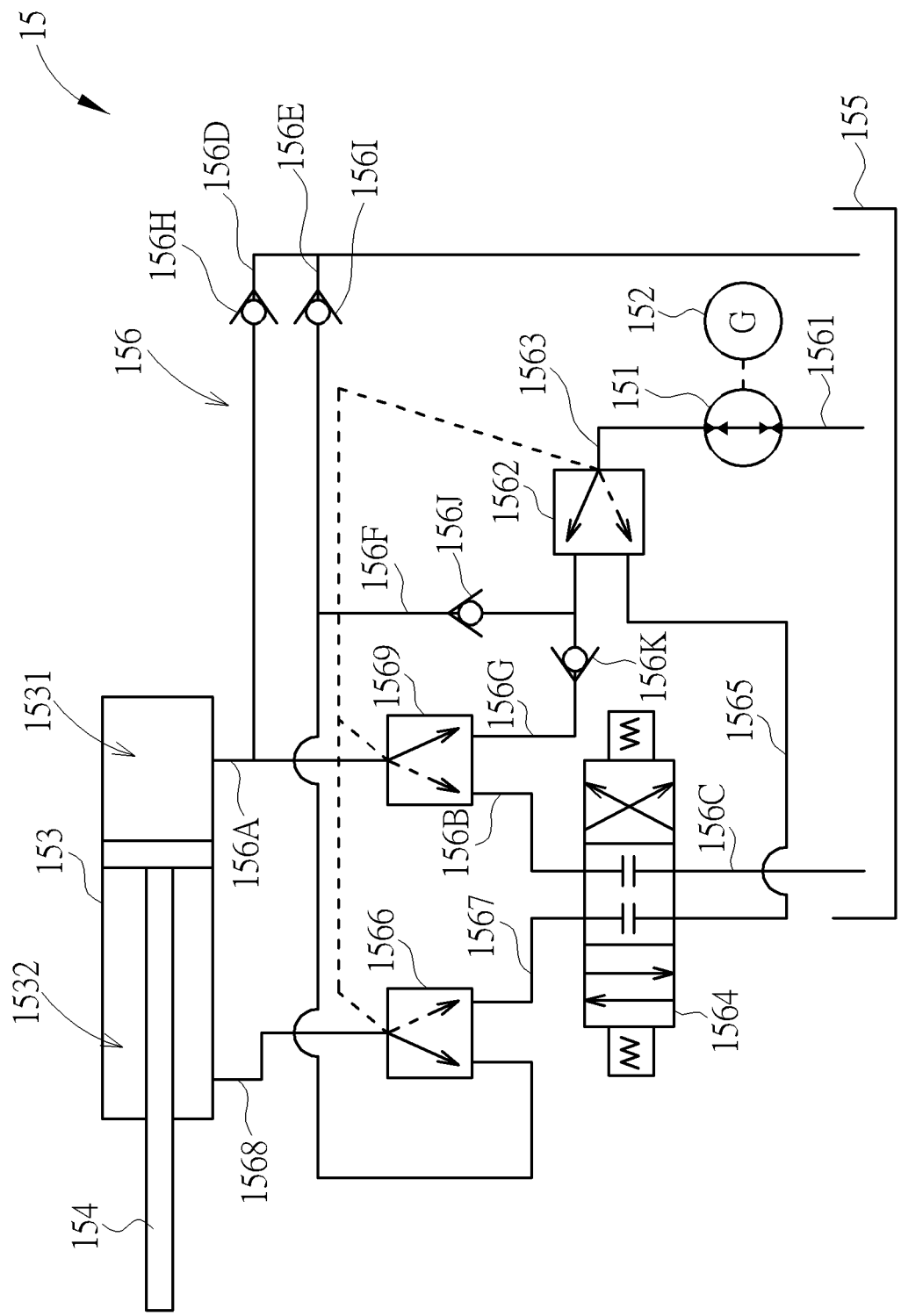
FIG. 3 is a piping and instrumentation diagram of each of lifting mechanisms according to the first embodiment of the present invention.

Specifically, please refer to FIG. 1 to FIG. 3. FIG. 3 is a piping and instrumentation diagram of each of the lifting mechanisms 15 according to the first embodiment of the present invention. As shown in FIG. 1 to FIG. 3, each of the lifting mechanisms 15 includes a hydraulic energy conversion component 151, a motor generator 152, a hydraulic cylinder 153, a piston 154, an oil sump 155 and an oil circulation system 156. The motor generator 152 is coupled to the hydraulic energy conversion component 151. The hydraulic energy conversion component 151 can be used as a hydraulic pump, which can convert mechanical energy into hydraulic energy, so as to drive fluid, such as hydraulic oil, to flow. The hydraulic energy conversion component 151 also can be used as a hydraulic motor, which can convert hydraulic energy into mechanical energy, so as to be driven by the fluid. The hydraulic cylinder 153 is coupled to the main body 12. The piston 154 is movably disposed on the hydraulic cylinder 153 to divide the hydraulic cylinder 153 into a first chamber 1531 and a second chamber 1532. The piston 154 is coupled to the arm 132. The oil sump 155 is for accommodating hydraulic oil. The oil circulation system 156 is for transporting the hydraulic oil. When each of the lifting mechanisms 15 is in the driving mode, the control unit 16 can control the motor generator 152 to drive the hydraulic energy conversion component 151 to transport the hydraulic oil to one of the first chamber 1531 and the second chamber 1532 through the oil circulation system 156. When the hydraulic oil is transported to the one of the first chamber 1531 and the second chamber 1532 through the oil circulation system 156, the piston 154 is driven to move to the other one of the first chamber 1531 and the second chamber 1532, so as to drive the piston 154 to extend out of or retract into the hydraulic cylinder 153 for driving the arm 132 to rotate along a first rotating direction D1 or a second rotating direction D2 opposite to the first rotating direction D1 to increase or decrease the included angle included between the arm 132 and the main body 12. When each of the lifting mechanisms 15 is in the electricity generating mode, the control unit 16 does not control the motor generator 152 to drive the hydraulic energy conversion component 151. At this moment, the piston 154 can be driven by a rotating movement of the arm 132 relative to the main body 12 around the horizontal axis A2. When the piston 154 is driven to move toward one of the first chamber 1531 and the second chamber 1532 to transport the hydraulic oil to the other one of the first chamber 1531 and the second chamber 1532 through the oil circulation system 156, the hydraulic energy conversion component 151 can be driven by the hydraulic oil to drive the motor generator 152 to generate electricity.

More specifically, the oil circulation system 156 includes a first tubing 156I, a first switch valve 1562, a second tubing 1563, a three-position and four-way directional control valve 1564, a third tubing 1565, a second switch valve 1566, a fourth tubing 1567, a fifth tubing 1568, a third switch valve 1569, a sixth tubing 156A, a seventh tubing 156B, an eighth tubing 156C, a ninth tubing 156D, a tenth tubing 156E, an eleventh tubing 156F and a twelfth tubing 156G. The first tubing 156I is communicated between the hydraulic energy conversion component 151 and the oil sump 155. The second tubing 1563 is communicated between the first switch valve 1562 and the hydraulic energy conversion component 151. The third tubing 1565 is communicated between the three-position and four-way directional control valve 1564 and the first switch valve 1562. The fourth tubing 1567 is communicated between the second switch valve 1566 and the three-position and four-way directional control valve 1564. The fifth tubing 1568 is communicated between the second chamber 1532 and the second switch valve 1566. The sixth tubing 156A is communicated between the third switch valve 1569 and the first chamber 1531. The seventh tubing 156B is communicated between the three-position and four-way directional control valve 1564 and the third switch valve 1569. The eighth tubing 156C is communicated between the oil sump 155 and the three-position and four-way directional control valve 1564. The ninth tubing 156D is communicated between the first chamber 1531 and the oil sump 155. The tenth tubing 156E is communicated between the second switch valve 1566 and the oil sump 155. The eleventh tubing 156F is communicated between the first switch valve 1562 and the second switch valve 1566. The twelfth tubing 156G is communicated between the first switch valve 1562 and the third switch valve 1569.

Preferably, the oil circulation system 156 further includes a first check valve 156H, a second check valve 156I, a third check valve 156J and a fourth check valve 156K. The first check valve 156H is disposed on the ninth tubing 156D and configured to restrain the hydraulic oil from flowing from the first chamber 1531 toward the oil sump 155. The second check valve 156I is disposed on the tenth tubing 156E and configured to restrain the hydraulic oil from flowing from the second chamber 1532 toward the oil sump 155 through the second switch valve 1566. The third check valve 156J is disposed on the eleventh tubing 156F and configured to restrain the hydraulic oil from flowing from the first switch valve 1562 toward the second switch valve 1566. The fourth check valve 156K is disposed on the twelfth tubing 156G and configured to restrain the hydraulic oil from flowing from the first switch valve 1562 toward the third switch valve 1569. The first check valve 156H, the second check valve 156I, the third check valve 156J and the fourth check valve 156K are for ensuring the hydraulic oil to flow along correct flowing directions.

As shown in FIG. 1 and FIG. 3, when it is desired to utilize each of the lifting mechanisms 15 to drive the arm 132 to rotate relative to the main body 12 around the horizontal axis A2 along the first rotating direction D1 as shown in FIG. 1, the control unit 16 can be utilized to switch each of the lifting mechanisms 15 to the driving mode and switch the first switch valve 1562, the three-position and four-way directional control valve 1564, the second switch valve 1566 and the third switch valve 1569 to corresponding states respectively, so that the hydraulic oil can be driven by the hydraulic energy conversion component 151 to flow from the oil sump 155 into the first chamber 1531 through the first tubing 156I, the second tubing 1563, the first switch valve 1562, the third tubing 1565, the three-position and four-way directional control valve 1564, the seventh tubing 156B, the third switch valve 1569 and the sixth tubing 156A, so as to push the piston 154 to move toward the second chamber 1532. When the piston 154 moves toward the second chamber 1532, the hydraulic oil inside the second chamber 1532 can be driven to flow through the fifth tubing 1568, the second switch valve 1566, the fourth tubing 1567, the three-position and four-way directional control valve 1564 and the eighth tubing 156C into the oil sump 155. Furthermore, when the piston 154 moves toward the second chamber 1532, the piston 154 extends out of the hydraulic cylinder 153, so as to drive the arm 132 to rotate relative to the main body 12 around the horizontal axis A2 along the first rotating direction D1.

When it is desired to utilize each of the lifting mechanisms 15 to drive the arm 132 to rotate relative to the main body 12 around the horizontal axis A2 along the second rotating direction D2 as shown in FIG. 1, the control unit 16 can be utilized to switch each of the lifting mechanisms 15 to the driving mode and switch the first switch valve 1562, the three-position and four-way directional control valve 1564, the second switch valve 1566 and the third switch valve 1569 to corresponding states respectively, so that the hydraulic oil can be driven by the hydraulic energy conversion component 151 to flow from the oil sump 155 into the second chamber 1532 through the first tubing 156I, the second tubing 1563, the first switch valve 1562, the third tubing 1565, the three-position and four-way directional control valve 1564, the fourth tubing 1567, the second switch valve 1566 and the fifth tubing 1568, so as to push the piston 154 to move toward the first chamber 1531. When the piston 154 moves toward the first chamber 1531, the hydraulic oil inside the first chamber 1531 can be driven to flow through the sixth tubing 156A, the third switch valve 1569, the seventh tubing 156B, the three-position and four-way directional control valve 1564 and the eighth tubing 156C into the oil sump 155. Furthermore, when the piston 154 moves toward the first chamber 1531, the piston 154 retracts into the hydraulic cylinder 153, so as to drive the arm 132 to rotate relative to the main body 12 around the horizontal axis A2 along the second rotating direction D2.

When it is desired to utilize each of the lifting mechanisms 15 to generate electricity, the control unit 16 can be utilized to switch each of the lifting mechanisms 15 to the electricity generating mode and switch the first switch valve 1562, the three-position and four-way directional control valve 1564, the second switch valve 1566, the third switch valve 1569 to corresponding states respectively, so that the piston 154 can be driven by the rotating movement of the arm 132 relative to the main body 12 around the horizontal axis A2 to move. When the arm 132 rotates relative to the main body 12 around the horizontal axis A2 along the first rotating direction D1, the piston 154 is driven to move toward the second chamber 1532 to drive the hydraulic oil to flow from the oil sump 155 into the first chamber 1531 through the ninth tubing 156D and the sixth tubing 156A by pressure difference and drive the hydraulic oil to flow from the second chamber 1532 into the oil sump 155 through the fifth tubing 1568, the second switch valve 1566, the eleventh tubing 156F, the first switch valve 1562, the second tubing 1563 and the first tubing 156I, so that the hydraulic energy conversion component 151 is driven by the hydraulic oil to drive the motor generator 152 to generate electricity. When the arm 132 rotates relative to the main body 12 around the horizontal axis A2 along the second rotating direction D2, the piston 154 is driven to move toward the first chamber 1531 to drive the hydraulic oil to flow from the oil sump 155 into the second chamber 1532 through the tenth tubing 156E, the second switch valve 1566 and the fifth tubing 1568 by pressure difference and drive the hydraulic oil to flow from the first chamber 1531 into the oil sump 155 through the sixth tubing 156A, the third switch valve 1569, the twelfth tubing 156G, the first switch valve 1562, the second tubing 1563 and the first tubing 156I, so that the hydraulic energy conversion component 151 is driven by the hydraulic oil to drive the motor generator 152 to generate electricity.

Figure 4:
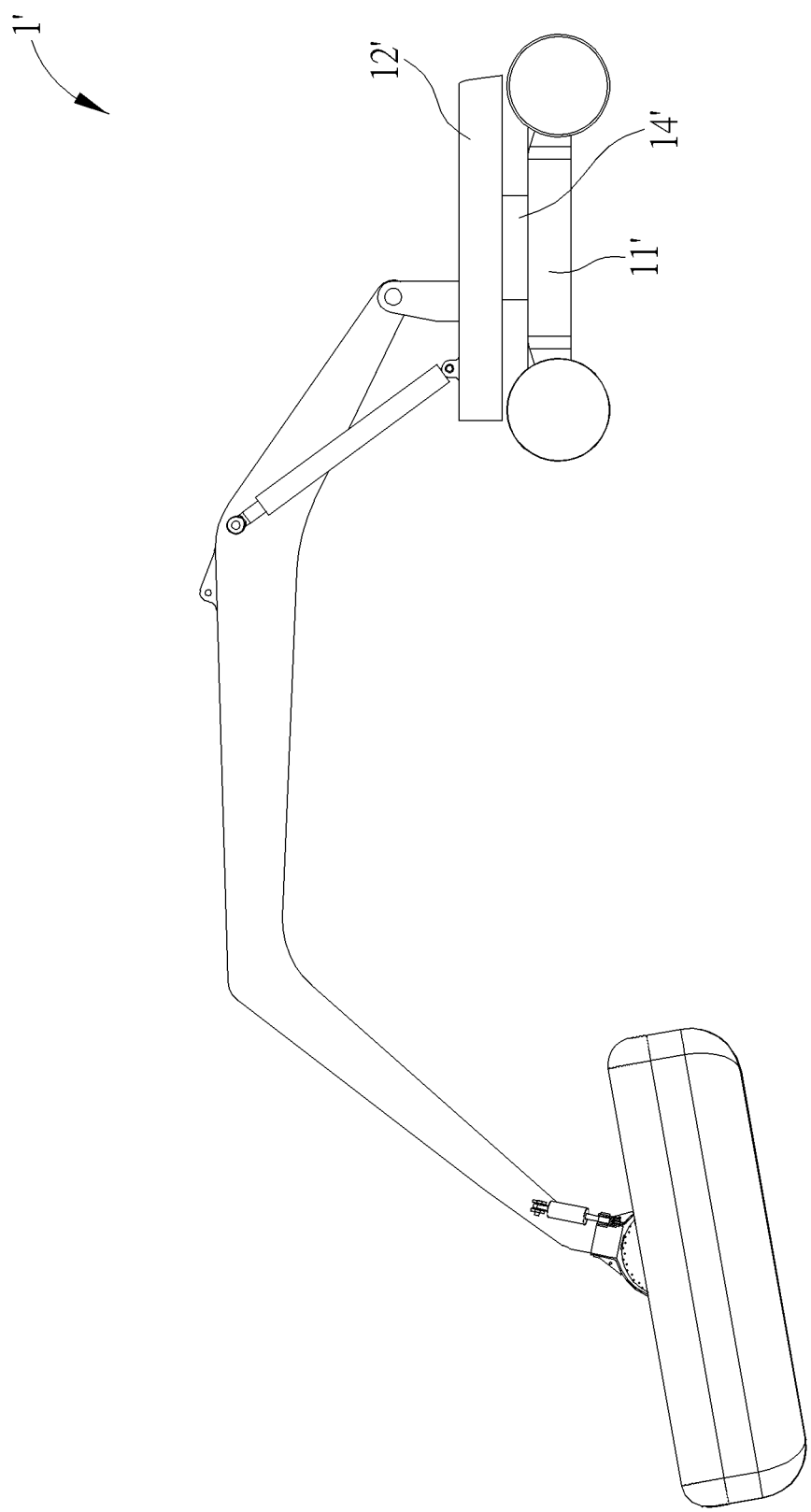
FIG. 4 is a diagram of a multi-axial wave energy conversion device according to a second embodiment of the present invention.
Figure 5:
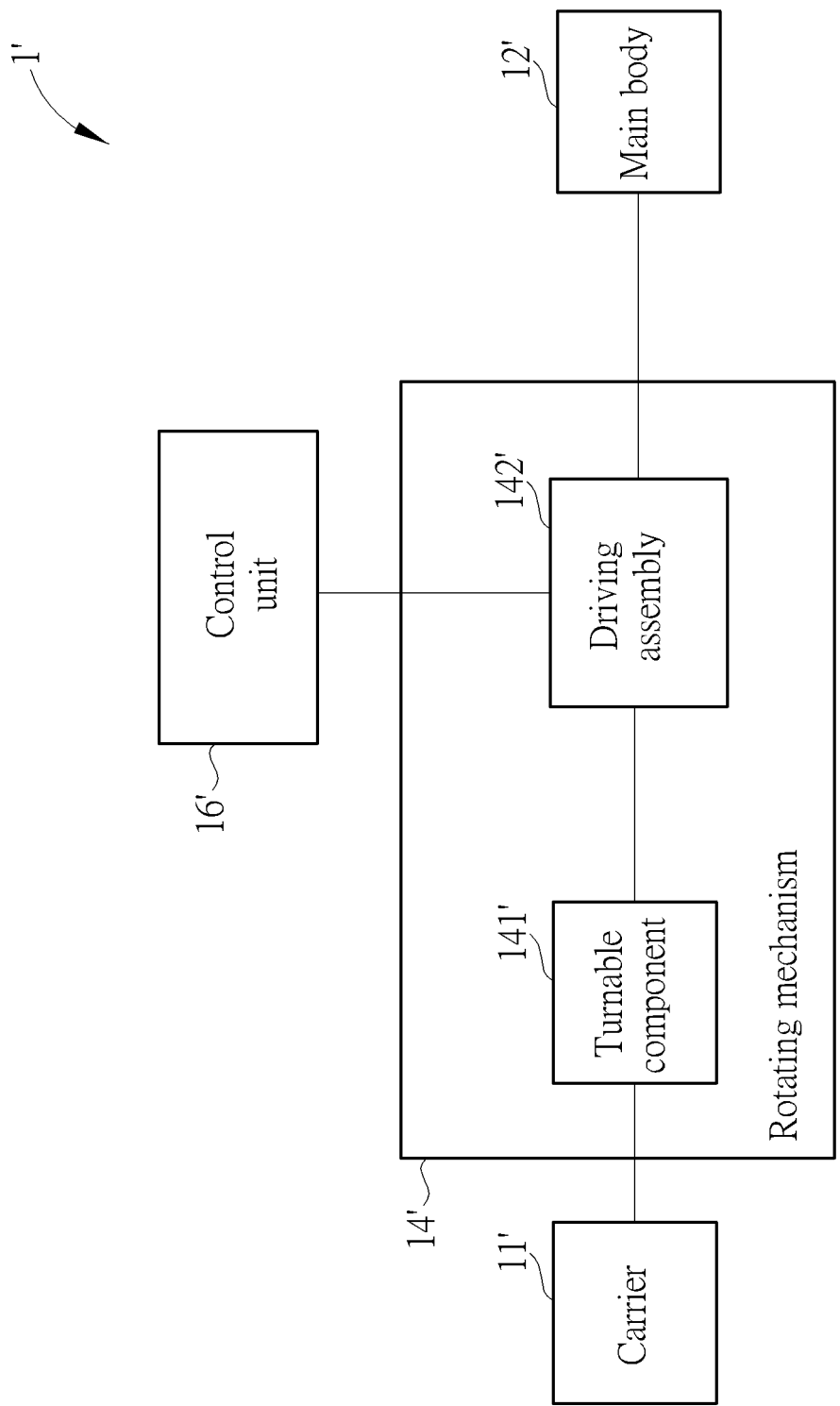
FIG. 5 is a partial functional block diagram of the multi-axial wave energy conversion device according to the second embodiment of the present invention.

However, the present invention is not limited to this embodiment. Please refer to FIG. 4 and FIG. 5. FIG. 4 is a diagram of a multi-axial wave energy conversion device 1' according to a second embodiment of the present invention. FIG. 5 is a partial functional block diagram of the multi-axial wave energy conversion device 1' according to the second embodiment of the present invention. As shown in FIG. 4 and FIG. 5, the multi-axial wave energy conversion device 1' of this embodiment is similar to the multi-axial wave energy conversion device 1 of the first embodiment. Different from the first embodiment, in this embodiment, a carrier 11' can be another wheel type carrier. A turnable component 141' of a rotating mechanism 14' can be fixedly coupled to a disposal platform of the carrier 11' and rotatably coupled to a main body 12'. A driving assembly 142' can be coupled between the main body 12' and the turnable component 141'. A control unit 16' can be configured to control the driving assembly 142' to drive the turnable component 141' to rotate relative to the main body 12'. Other structures of this embodiment are similar to the ones of the first embodiment and can have similar variations described above. Detailed description is omitted herein for simplicity.

Figure 6:
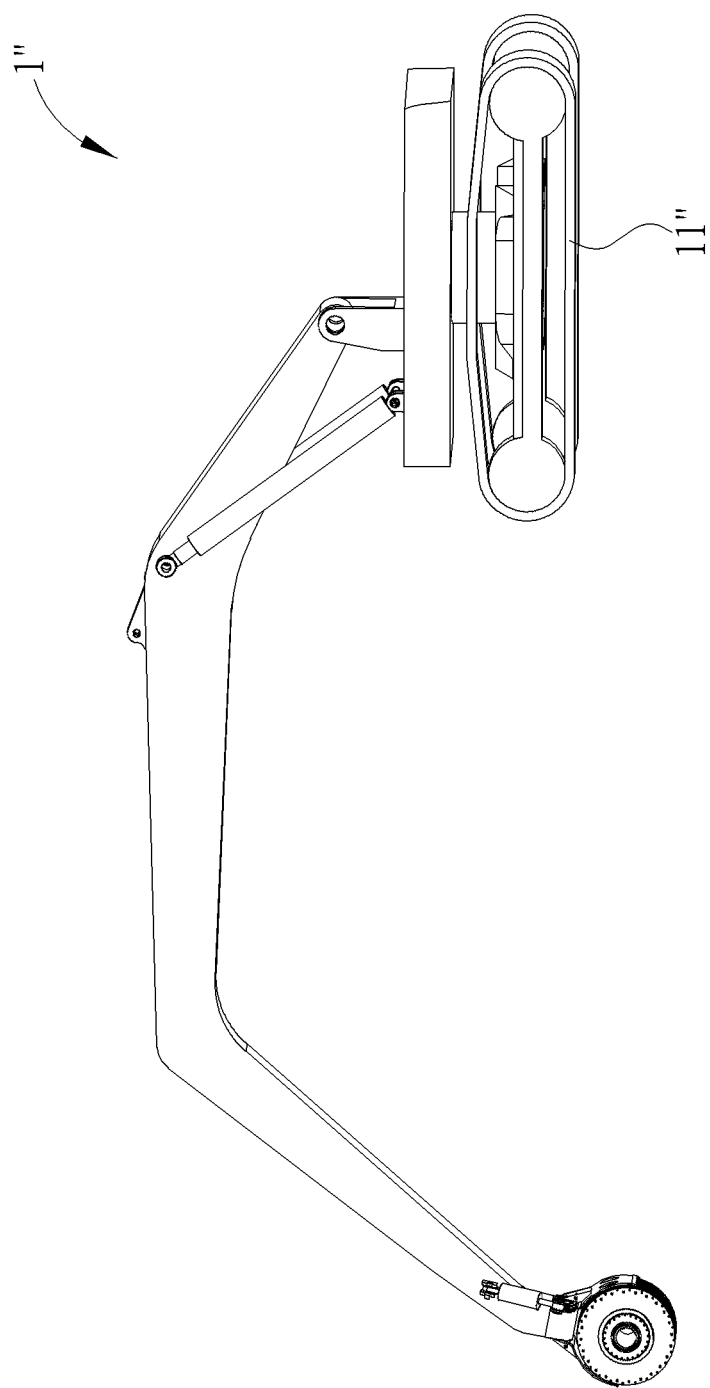
FIG. 6 is a partial diagram of a multi-axial wave energy conversion device according to a third embodiment of the present invention.

Please refer to FIG. 6. FIG. 6 is a partial diagram of a multi-axial wave energy conversion device 1" according to a third embodiment of the present invention. As shown in FIG. 6, the multi-axial wave energy conversion device 1" of this embodiment is similar to the multi-axial wave energy conversion device 1' of the second embodiment. Different from the second embodiment, in this embodiment, a carrier 11" can be a caterpillar type carrier. Other structures of this embodiment are similar to the ones of the second embodiment and can have similar variations described above. Detailed description is omitted herein for simplicity.

Figure 7:
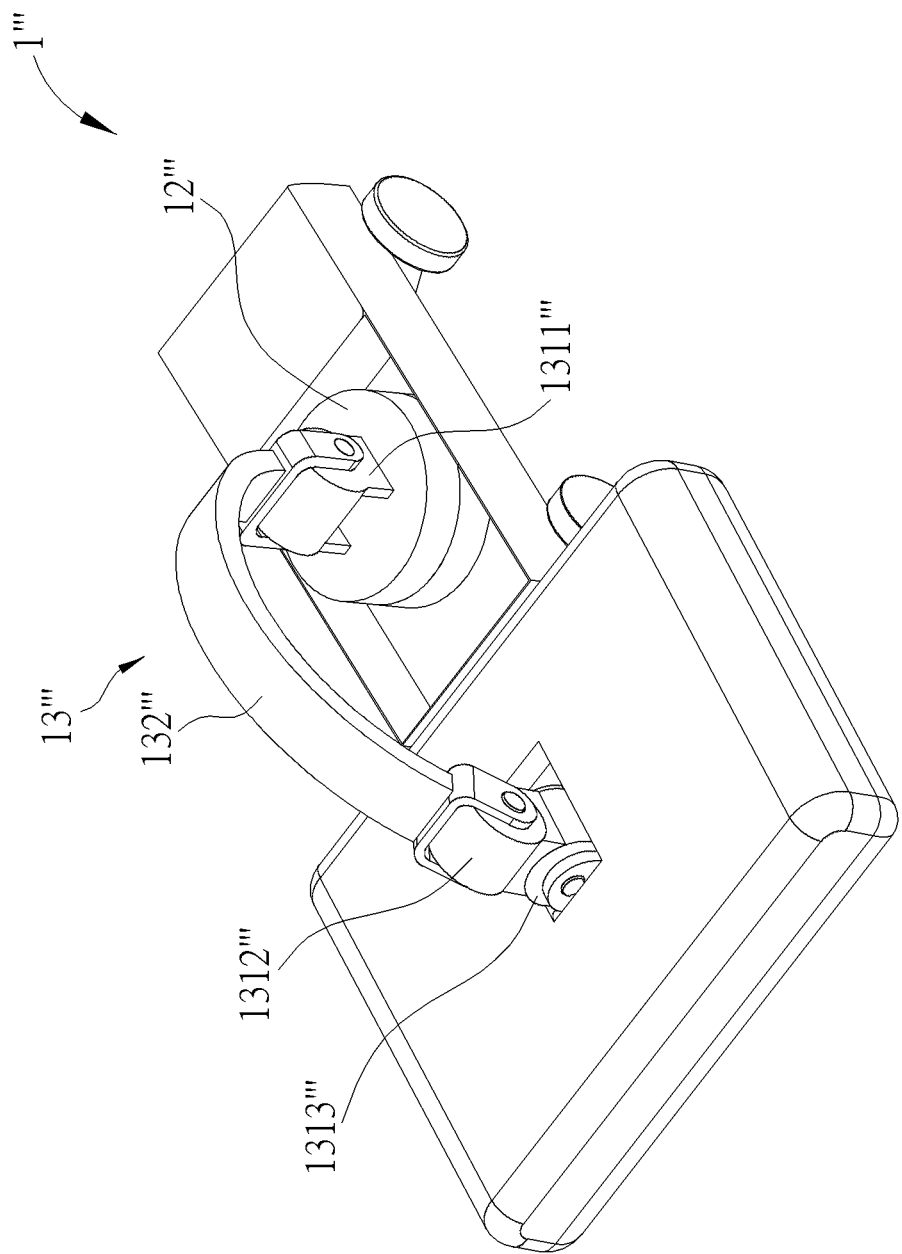
FIG. 7 is a diagram of a multi-axial wave energy conversion device according to a fourth embodiment of the present invention.

Furthermore, in another embodiment, the multi-axial wave energy conversion device can include one of the rotating mechanism and the lifting mechanism. For example, please refer to FIG. 7. FIG. 7 is a diagram of a multi-axial wave energy conversion device 1''' according to a fourth embodiment of the present invention. As shown in FIG. 7, different from the aforementioned embodiments, in this embodiment, the multi-axial wave energy conversion device 1''' does not include any lifting mechanism. Furthermore, a wave energy conversion assembly 13''' can include a first permanent magnet generator 1311''', a second permanent magnet generator 1312''' and a third permanent magnet generator 1313'''. A stator and a rotor of the first permanent magnet generator 1311''' can be respectively coupled to a main body 12''' and an arm 132'''. A stator of the second permanent magnet generator 1312''' can be coupled to a stator of the third permanent magnet generator 1313'''. A rotor of the second permanent magnet generator 1312''' and a rotor of the third permanent magnet generator 1313''' can be respectively coupled to the arm 132''' and a driving component 133'''. A rotating axis of the rotor of the second permanent magnet generator 1312''' relative to the stator of the second permanent magnet generator 1312''' can be substantially parallel to a rotating axis of the rotor of the first permanent magnet generator 1311''' relative to the stator of the first permanent magnet generator 1311''' and different from a rotating axis of the rotor of the third permanent magnet generator 1313''' relative to the stator of the third permanent magnet generator 1313'''. Preferably, the rotating axis of the rotor of the second permanent magnet generator 1312''' relative to the stator of the second permanent magnet generator 1312''' can be substantially perpendicular to the rotating axis of the rotor of the third permanent magnet generator 1313''' relative to the stator of the third permanent magnet generator 1313'''. Other structures of this embodiment are similar to the ones of the second embodiment and can have similar variations described above. Detailed description is omitted herein for simplicity.

Figure 8:
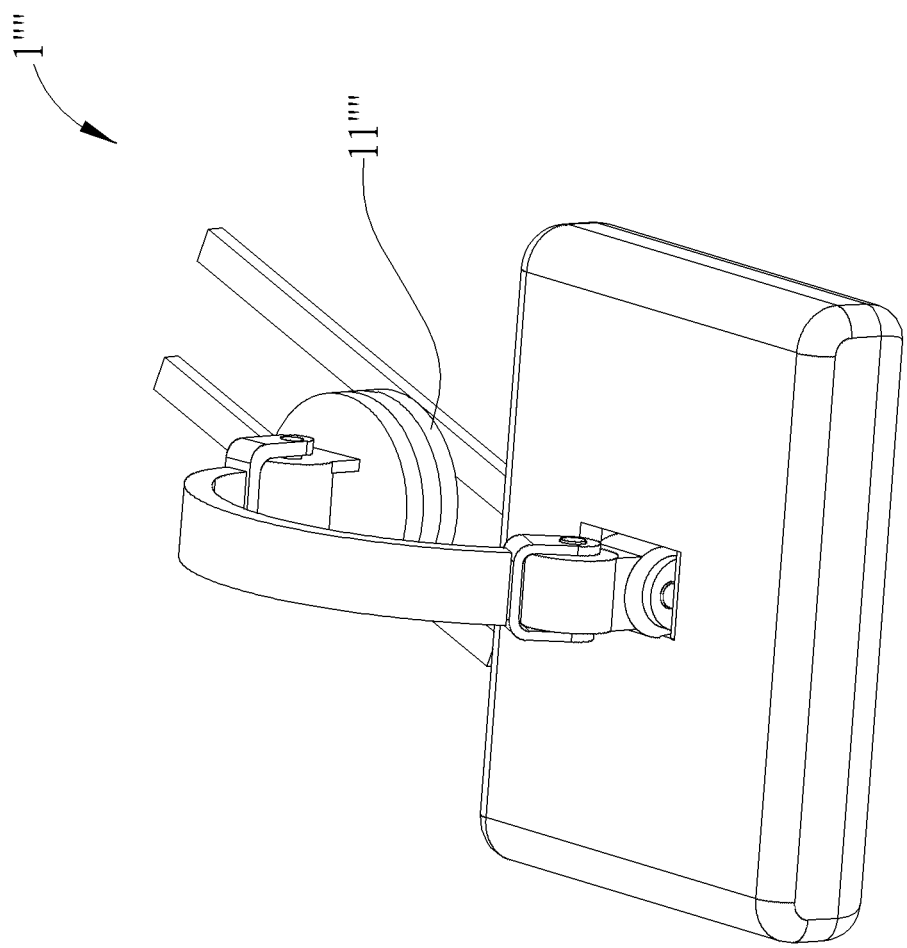
FIG. 8 is a diagram of a multi-axial wave energy conversion device according to a fifth embodiment of the present invention.

Please refer to FIG. 8. FIG. 8 is a diagram of a multi-axial wave energy conversion device 1'''' according to a fifth embodiment of the present invention. As shown in FIG. 8, the multi-axial wave energy conversion device 1'''' of this embodiment is similar to the multi-axial wave energy conversion device 1''' of the fourth embodiment. Different from the fourth embodiment, in this embodiment, a carrier 11'''' can be a rail type carrier. Other structures of this embodiment are similar to the ones of the fourth embodiment and can have similar variations described above. Detailed description is omitted herein for simplicity.

Figure 9:
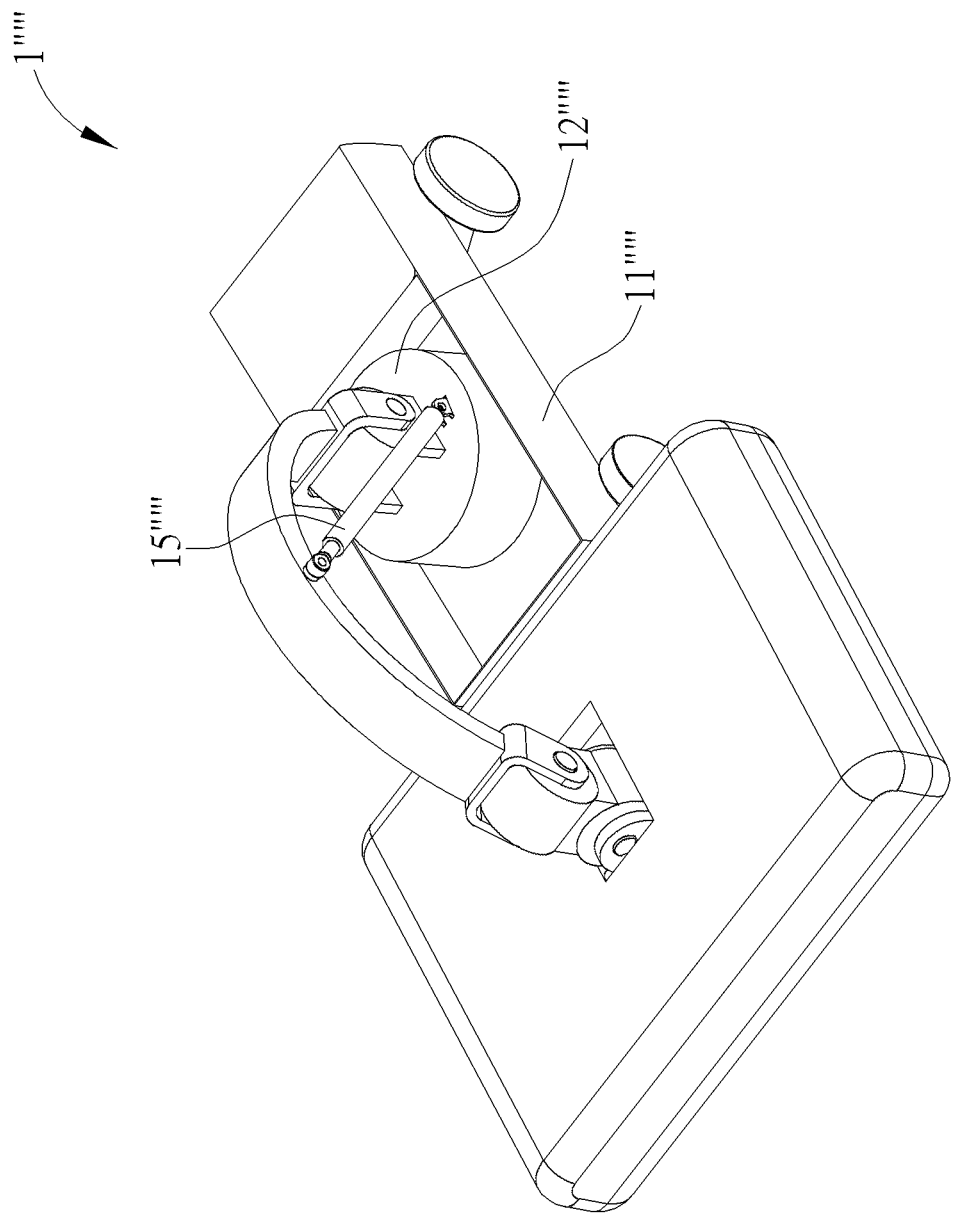
FIG. 9 is a diagram of a multi-axial wave energy conversion device according to a sixth embodiment of the present invention.

Please refer to FIG. 9. FIG. 9 is a diagram of a multi-axial wave energy conversion device 1''''' according to a sixth embodiment of the present invention. As shown in FIG. 9, the multi-axial wave energy conversion device 1''''' of this embodiment is similar to the multi-axial wave energy conversion device 1''' of the fourth embodiment. Different from the fourth embodiment, in this embodiment, the multi-axial wave energy conversion device 1''''' can include one lifting mechanism 15''''' but does not include any rotating mechanism. In other words, in this embodiment, a main body 12''''' can be fixedly disposed on a carrier 11''''' directly. Other structures of this embodiment are similar to the ones of the fourth embodiment and can have similar variations described above. Detailed description is omitted herein for simplicity.

Figure 10:
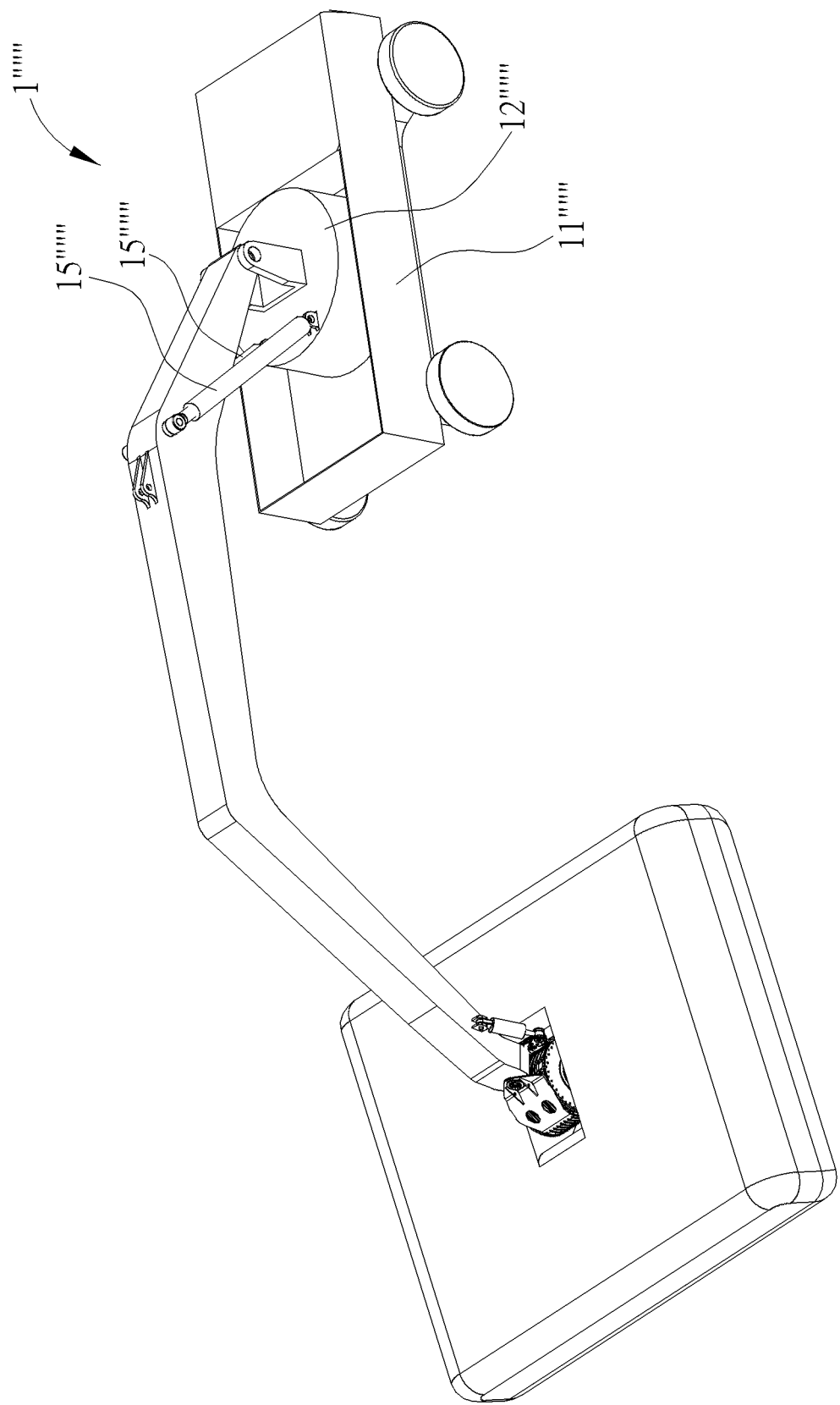
FIG. 10 is a diagram of a multi-axial wave energy conversion device according to a seventh embodiment of the present invention.

Please refer to FIG. 10. FIG. 10 is a diagram of a multi-axial wave energy conversion device 1'''''' according to a seventh embodiment of the present invention. As shown in FIG. 9, the multi-axial wave energy conversion device 1'''''' of this embodiment is similar to the multi-axial wave energy conversion device 1 of the first embodiment. Different from the first embodiment, in this embodiment, the multi-axial wave energy conversion device 1'''''' can include two lifting mechanisms 15'''''' but does not include any rotating mechanism. In other words, in this embodiment, a main body 12'''''' can be fixedly disposed on a carrier 11'''''' directly. Other structures of this embodiment are similar to the ones of the first embodiment and can have similar variations described above. Detailed description is omitted herein for simplicity.

In summary, in the present invention, the multi-axial wave energy conversion device can utilize the rotating mechanism to drive the main body to rotate relative to the carrier around the vertical axis for adjusting an orientation of the arm relative to the carrier and can further utilize the lifting mechanism to drive the arm to rotate relative to the main body around the horizontal axis perpendicular to the vertical axis for adjusting the included angle included between the arm and the main body according to different environmental conditions. Therefore, the multi-axial wave energy conversion device can generate electricity stably. Furthermore, before a typhoon is approaching, a user can adjust the orientation of the arm relative to the carrier and adjust the included angle included between the arm and the main body to move the wave energy conversion assembly away from the sea and then move the carrier to move the multi-axial wave energy conversion device to a safe place, so as to prevent any damage of the multi-axial wave energy conversion device. Besides, the lifting mechanism of the present invention can be used to not only adjust the included angle included between the arm and the main body but also generate electricity. Therefore, the multi-axial wave energy conversion device has high mobility, great environmental adaptability and stable electricity generation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-axial wave energy conversion device comprising:
   a carrier;
   a main body coupled to the carrier; and
   a wave energy conversion assembly coupled to the main body, the wave energy conversion assembly comprising at least one electricity generator, an arm and a driving component, the at least one electricity generator comprising a permanent magnet generator disposed between the arm and the driving component, and a hydraulic generator disposed between the permanent magnet generator and the arm, when the driving component is driven to move by waves relative to the arm, a movement of the driving component relative to the arm driving the permanent magnet generator and the hydraulic generator to generate electricity.

2. The multi-axial wave energy conversion device of claim 1, further comprising at least one lifting mechanism and a control unit, the at least one lifting mechanism being coupled between the arm and the main body and electrically connected to the control unit, and the control unit being further configured to control the lifting mechanism to drive the arm to rotate relative to the main body around a horizontal axis perpendicular to a vertical axis for adjusting an included angle included between the arm and the main body.

3. The multi-axial wave energy conversion device of claim 2, wherein the control unit controls the at least one lifting mechanism to drive the arm to rotate relative to the main body around the horizontal axis according to at least one of a wave height, a tide level and an electricity generation amount.

4. The multi-axial wave energy conversion device of claim 2, wherein the at least one lifting mechanism is further configured to generate the electricity, and the at least one lifting mechanism comprises:
   a hydraulic energy conversion component;
   a motor generator coupled to the hydraulic energy conversion component;
   a hydraulic cylinder coupled to one of the arm and the main body;
   a piston movably disposed in the hydraulic cylinder to divide the hydraulic cylinder into a first chamber and a second chamber, the piston being coupled to another one of the arm and the main body;
   an oil sump for accommodating a hydraulic oil; and
   an oil circulation system for transporting the hydraulic oil;
   wherein when the motor generator drives the hydraulic energy conversion component to transport the hydraulic oil to one of the first chamber and the second chamber through the oil circulation system, the piston is driven to move to another one of the first chamber and the second chamber, and when the piston is driven to move to the one of the first chamber and the second chamber to transport the hydraulic oil to the another one of the first chamber and the second chamber, the hydraulic energy conversion component drives the motor generator to generate the electricity.

5. The multi-axial wave energy conversion device of claim 4, wherein the oil circulation system comprises:
   a first tubing communicated between the hydraulic energy conversion component and the oil sump;
   a first switch valve;

a second tubing communicated between the first switch valve and the hydraulic energy conversion component;
a three-position and four-way directional control valve;
a third tubing communicated between the three-position and four-way directional control valve and the first switch valve;
a second switch valve;
a fourth tubing communicated between the second switch valve and the three-position and four-way directional control valve;
a fifth tubing communicated between the second chamber and the second switch valve;
a third switch valve;
a sixth tubing communicated between the third switch valve and the first chamber;
a seventh tubing communicated between the three-position and four-way directional control valve and the third switch valve;
an eighth tubing communicated between the oil sump and the three-position and four-way directional control valve;
a ninth tubing communicated between the first chamber and the oil sump;
a tenth tubing communicated between the second switch valve and the oil sump;
an eleventh tubing communicated between the first switch valve and the second switch valve; and
a twelfth tubing communicated between the first switch valve and the third switch valve.

6. The multi-axial wave energy conversion device of claim 5, wherein the oil circulation system further comprises:
a first check valve disposed on the ninth tubing and configured to restrain the hydraulic oil from flowing from the first chamber toward the oil sump;
a second check valve disposed on the tenth tubing and configured to restrain the hydraulic oil from flowing from the second chamber toward the oil sump through the second switch valve;
a third check valve disposed on the eleventh tubing and configured to restrain the hydraulic oil from flowing from the first switch valve toward the second switch valve; and
a fourth check valve disposed on the twelfth tubing and configured to restrain the hydraulic oil from flowing from the first switch valve toward the third switch valve.

7. The multi-axial wave energy conversion device of claim 1, further comprising a rotating mechanism and a control unit electrically connected to the rotating mechanism and configured to control the rotating mechanism to drive the main body to rotate relative to the carrier around a vertical axis perpendicular to a horizontal axis, the rotating mechanism comprising a turnable component and a driving assembly, the driving assembly being coupled to the turnable component and electrically connected to the control unit, and the control unit being further configured to control the driving assembly to drive the turnable component to rotate relative to one of the main body and the carrier, so as to drive the main body relative to the carrier around the vertical axis perpendicular to the horizontal axis for adjusting an orientation of the arm relative to the carrier.

8. The multi-axial wave energy conversion device of claim 7, wherein the turnable component is rotatably coupled to the one of the main body and the carrier and fixedly coupled to another one of the main body and the carrier.

9. The multi-axial wave energy conversion device of claim 7, wherein the control unit controls the driving assembly to rotate the turnable component to drive the main body to rotate relative to the carrier around the vertical axis according to at least one of a wind direction, a wave direction and an electricity generation amount.

10. The multi-axial wave energy conversion device of claim 1, wherein the carrier is a carrier having a wheel, a carrier having a track chain or a carrier on a rail.

* * * * *